Figures 1, 2:
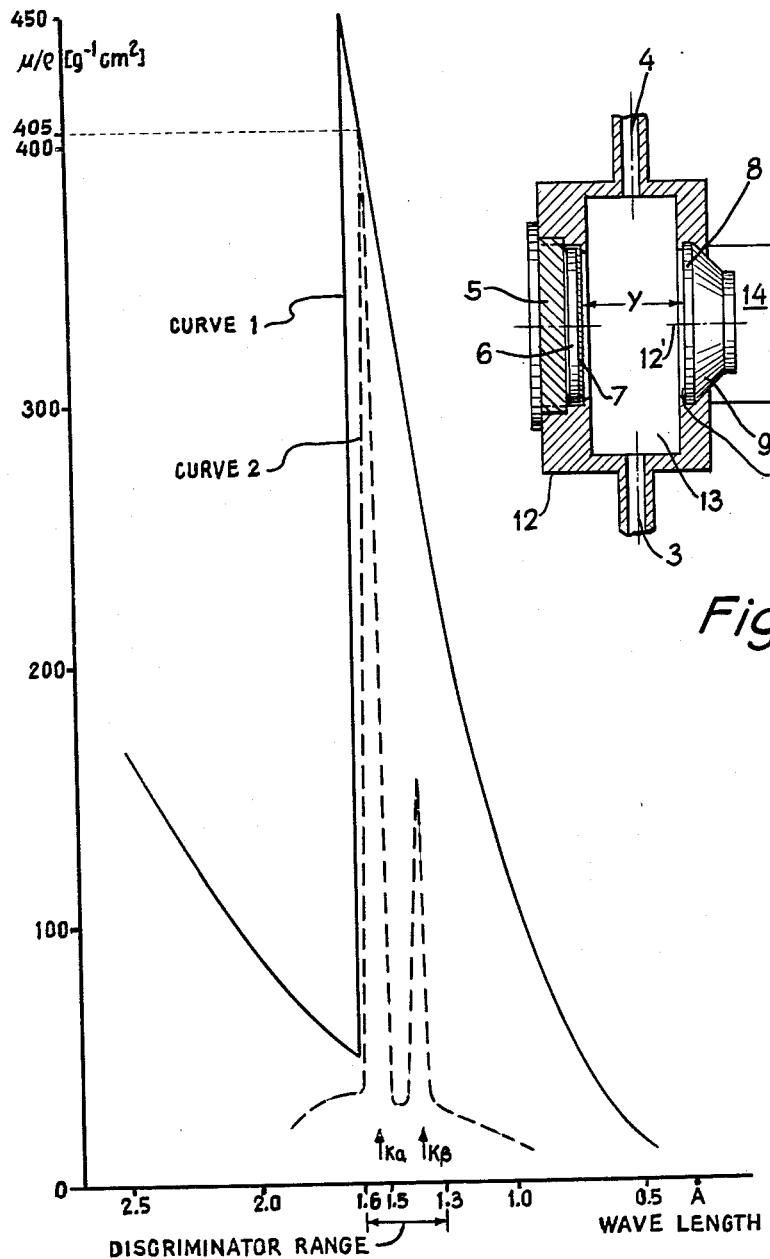

United States Patent Office 3,256,430
Patented June 14, 1966

3,256,430
X-RAY ANALYSIS APPARATUS FOR DETERMINING THE PRESENCE OF SUBSTANCES
Hermann Amrehn, Marl, Germany, assignor to Chemische Werke Huls, A.G., Marl, Kreis Recklinghausen, Germany
Filed July 13, 1962, Ser. No. 210,610
Claims priority, application Germany, July 31, 1961, C 24,757
6 Claims. (Cl. 250—43.5)

The present invention relates to a method and apparatus for determining specific substances in fluids, liquids or gases, by means of X-rays.

It is known to detect specific substances by means of beta radiation emanated by tritium, strontium 90, or cadmium 109, or by means of X-rays of long wave length emitted from the isotope Fe 55. With such methods, for example, sulphur has been detected in oil or in organic nitrogen. These known methods have the disadvantage of registering not only the specific element to be detected, but already minor and spurious impurities of elements having a relatively high atomic number, will distort the measuring result.

It is a primary object of the present invention to provide for a new and improved method and apparatus for detecting specific substances in fluids, whereby the deficiencies of known method and apparatus are overcome and whereby it is made possible to exclude the simultaneous detection of impurities from the measuring result.

It is another object of the present invention to provide a new and improved method and apparatus utilizing specific X-rays whereby the X-ray source has to have a specific relationship to the substance to be detected as far as the X-ray absorption of the latter substance is concerned.

In accordance with one aspect of the present invention in a preferred embodiment thereof, it is suggested to provide the following steps:

The alpha or beta rays of a particle-radioactive substance, preferably tritium, is caused to impinge upon a first substance so that this first substance emits X-rays. This first substance has been previously selected so that its atomic number is larger by at least two units than the atomic number of the substance (second substance) to be detected. Aside from this relationship of their atomic numbers, the further condition is that there be an X-ray emission line of the first substance in the range of the K or L absorption edge of the second substance. The fluid containing this second substance is subjected to the X-rays produced in and emanated by the first substance; then the absorption of the X-rays by the second substance in the range of the K or L absorption edge thereof is detected.

As far as the principle is concerned, the afore-mentioned rule is universal in character. For practical reasons, however, there is the limit that the characteristical X-rays, produced and used must have sufficient energy to traverse a layer of the (second) substance of at least 1 mm. effective thickness. Also, the radiation leaving the second substance must be detectable.

It has, therefore, been found that elements to be detected by the inventive method should have at least an atomic number of $Z=10$ if in a gas and of $Z=16$ if in a liquid. Furthermore, due to the present availability of materials which can be employed as a K-emitter, the maximum atomic number of the material to be detected must be lower than 82. This is the case since the atomic number of the emitter must, when $Z=82$, be equal to 84, representing polonium, an element unavailable in films or other compact forms, and which is itself radioactive and therefore useless for this invention. In the same manner, all other elements having an atomic number above 84 cannot be employed as K-emitter for the present process.

An apparatus built in accordance with the invention may comprise a casing with inlet and outlet through which the fluid containing the (second) substance to be detected is passing. Across the flow path, a measuring region is defined by the following elements. On one side, in the casing, there is a sheet of foil of a (first) substance having an atomic number higher by two units than the atomic number of the substance to be detected. Across the casing, on the other end of the measuring region, there is the "window" of an X-ray detector to which is connected a quantum energy discriminator or which is attuned by dimensioning to the quantum energy range at the K or L absorption edge of the substance to be detected. The detector, with or without discriminator is connected to a measuring instrument of conventional design. Adjacent the sheet or foil there is disposed a particle-radioactive source, for example, tritium.

While the specification concludes with claims particularly pointing out and distinctly claiming the subject matter which is regarded as the invention, it is believed that the invention, the objects of the invention and furher objects and advantages thereof will be better understood from the following description taken in connection with the accompanying drawing in which:

FIG. 1 illustrates a graph in which are plotted against wave length the emission and absorption characteristics of several substances employed in conjunction with a preferred embodiment of the invention, and FIG. 2 illustrates in cross sectional view a measuring container with adjoining elements to be used to practice the invention.

Before proceeding to the detailed description of the drawings and detailed features of the invention, a brief orientation on the general physical background should be made.

A radiation of the intensity $I_0$ after having passed through a material at distance Y therein is attenuated in accordance with the rule $$I=I_0 \cdot e^{-\mu Y}$$

with $\mu$ being the coefficient of attenuation and I being the intensity after such passing. If the radiation consists of longwave X-rays of a quantum energy below 80 kev, the attenuation is caused primarily by photo absorption; i.e. the attenuation coefficient $\mu$ is substantially similar to the photo absorption coefficient $\tau$ of such material. There is a functional relationship and dependency of the coefficient $\tau$ upon quantum-energy E of the radiation, the density $\rho$, the atomic number Z and the atomic weight A of the material. The formula of such relationship can be written as:

$$\mu \cong \tau = f(E) \cdot \rho \cdot \frac{Z^4}{A}$$

with $f$, for example being an empirical function. Accordingly, the photo absorption depends primarily upon the atomic composition of the substance through which such low energy X-rays are travelling. Since density is a function of temperature, pressure and other ambient conditions, one very often operates with the mass absorption coefficient $$\mu/\rho = f(E) \cdot \frac{Z^4}{A}$$

Turning now specifically to FIG. 1, there is plotted the mass coefficient $\mu/\rho$ against wave length in the range of 0.5 A. to 2.5 A. of cobalt (curve 1). A so-called K-absorption edge is found at 1.62 A., and the $\mu/\rho$ coefficient is 450 g.$^{-1}$cm.$^2$. For wavelengths smaller than 1.62 A. the mass absorption decreases from the peak value of the Kα absorption edge in a monotonous function.

Curve 2 illustrates the spectrum of the bremsstrahlung and characteristic radiation of a thin copper foil being subjected to the beta radiation of tritium. In tritium the maximum quantum energy of the emanated particles is 18 kev.

From curve 2 in FIG. 1 one can see the very strong Kα (1.53 A.) and Kβ (1.38 A.) emission lines of the X-ray thus produced. Comparing curves 1 and 2 one will see, that the absorption of cobalt at the Kα line of copper is 450 g.$^{-1}$cm.$^2$.

If one uses, as stated, tritium beta rays for producing X-rays in copper, 60% of the overall X-ray intensity produces a characteristic line spectrum. This portion of the emitted radiation, particularly the very strong Kα lines are found in the wave length range at the K absorption edge of cobalt.

It is known that benzol has an attenuation coefficient of 1.75 at the wave lengths of this Kα radiation, as compared with the 405 value of cobalt at that line as stated above. Thus, in a mixture of cobalt in benzol there is a range of variation from 0 to 100% (pure benzol to pure cobalt) and this range corresponds to a range of change of the absorption coefficient mixture embracing 403.23 units.

The prior art method referred to above and using Fe–55 as an X-ray source, results in a mass coefficient of benzol of 4.5 and a coefficient of 68 for cobalt, thus embracing the considerably smaller range of 63.2 units only as absorption variation range for a variable mixture of cobalt in benzol.

The graph of FIG. 1 illustrates the general rule underlying applicant's method: The substance constituting the X-ray source has emission lines (curve 2) directly at an absorption edge (curve 1) of the substance to be detected; this is due to the fact that as a condition precedent, the atomic numbers of the two substances are apart by two units.

FIG. 2 illustrates a measuring device capable of carrying out the inventive method for which purpose a novel apparatus is being suggested. The apparatus is, for example, to determine the cobalt content in benzol at a high accuracy with an error of no more than ±0.005% cobalt in benzol.

There is a pressure proof cylindrical casing 12 made of high-grade steel and including a measuring chamber 13, an inlet 3 and an outlet 4. Numeral 12' denotes the axis of symmetry of cylindrical casing 12.

There is an aperture in the front of casing 12 but closed at the outside thereof with a radiation shielding 5 which secures a metal foil 7 as X-ray source to casing 12. Foil 7 has pressed on its outside alpha or beta rays emanating substance 6. The aperture of casing 12 and the shielding 5 are preferably provided with threaded portions so that the latter can be screwed into the former.

The other side of casing 12 supports a scintillation crystal 8 secured thereto and being protected from the interior of measuring chamber 2 by a plastic foil 8'. In order to render scintillation crystal 8 more pressure proof, a light conductor 9 made, for example of polystyrol, is pressed onto and against the exterior surface of crystal 8. Light conductor 9 is connected for light ray conduction to a schematically indicated photo multiplier with amplifier 14. The electrical output in form of a train of pulses formed by and in this amplifier is fed to a single channel discriminator 10 for sorting of the pulses. The train of pulses appearing at the output of discriminator 10 are fed to a rate meter 11 connected thereto.

Upon proper adjustment, calibration and biasing of the amplifier and a zero displacement thereof to suppress "noise" therein, the rate meter can be provided with a scale and adjusted so that the concentration values appear directly at the indicator part of the meter. A rectifier-capacitor-feedback loop 15 is provided for automatic stabilization of the detector 14. The high voltage of the latter element is thus adapted to any changes in the sensitivity of the multiplier. Devices of this type are known and described, for example, by Trost "Dichte- und Dickenmessung nach dem Gamma-Durchstrahlungsverfahren mit Szintillometern, Atompraxis, vol. 6, 1960, pages 121–124," see particularly page 122.

The general mode of operation is deemed to be apparent from the foregoing description. Briefly, the fluid, liquid or gas passing from inlet 3 to outlet 4 through chamber 13 is subjected therein to the X-rays produced by foil 7 upon radioactive excitation by the tritium of source 6. The distance y in chamber 2 indicates the distance between foil 7 and crystal 8 and extends through the liquid. Thus, the X-rays which are detected by crystal 8 and the other electrical elements connected thereto, are responsive to the intensity of the nonabsorbed X-rays after having travelled the distance y. Variations of the absorption directly appear as indication at rate meter 11. The single channel discriminator sorts out these X-rays quanta of, for example, the Kαβ range of copper.

In the following, further specific examples shall be given. The basic rule is, that the material of foil 7 and of the substance in the fluid to be detected have atomic numbers which are apart by at least two units. The next rule is that either the emission lines of the foil fall into the range of the characteristical absorption near the K or the L absorption edges. In cases, this second rule might impose an additional precaution. If one uses the characteristical L-lines of an X-ray radiator-element, one has to avoid that in the fluid there are no further elements having their absorption edge in the range of K lines of the X-ray radiator element. To be more specific, an example of this latter precaution shall be given. Suppose one uses as foil 7 tungsten, and particularly the radiation of the L-line thereof is employed for the detection of cobalt in a liquid, one then has to avoid the presence of substances having an absorption edge in the range of the K lines of tungsten. This precaution, however, is necessary only if the X-ray detector responds to both K and L lines. If the energy band of the discriminator is tuned to include only the quantum energy range of the L-line of the radiation substance, here tungsten, while the quanta of the K-line are excluded, then this precaution is not necessary.

The radioactive sources usable as exciter-substance 6 are preferably tritrium, carbon 14, strontium 90 or nickel 63 as a source for beta radiation. Radium 210 is preferably used if alpha rays are to be employed for initiating X-rays.

FIG. 2 of the drawing illustrates schematically a scintillation counter which permits quantum energy discrimination of the output pulses. The amplitude of the pulses appearing at the input of element 10 are proportional to the energy of the respective quantum absorbed in the counter crystal. The discriminator is tuned so as to respond only to pulses of such height or amplitude falling within a range corresponding to a particular range about the absorption edge of the substance to be detected. Other pulses from the crystal 8 will be suppressed and only the X-ray quanta at the absorption edged will be sensed. If there is a copper foil as X-ray radiator 7 and if cobalt is to be detected in benzol, the quantum energy range to be detected and sorted out by the discriminator could be from 1.3 to 1.6 A. (see FIG. 1).

It will be noted from FIG. 1, that the X-rays of both the Kα and the Kβ emission lines of copper will be utilized in this case, and the absorption of these lines by cobalt appears in the absorption edge thereof (curve 2). The sensitivity of the detector is ±0.005% cobalt in benzol.

One could employ a simplified design in omitting the discriminator 11. In lieu thereof one then selects the thickness of the crystal 8 (measured in the direction of extension axis 12') or is so small, so that 95% of the quanta within the measuring range of quantum energies is detected. Due to the rapidly decreasing absorption coefficient of crystal 8 for increasing quantum energies, the X-ray quanta of higher energy will also appear only to a negligible amount. However, the accuracy of the measurement in such a case is still only ±0.01 to ±0.015% of cobalt in benzol.

A practical embodiment of the invention, designed as schematically illustrated in FIG. 2 had the following dimensions and other relevant data, and was used to detect cobalt in benzol with a range of variation of cobalt from zero to 5%.

The beta radiator is tritium having an activity of 2 curie. The X-ray radiator is a copper foil of 0.2 mm. thickness and having an active surface of 12 cm.$^2$ facing the inner part of the chamber. The measuring distance $y$ is 25 mm. (about 10"). There is a scintillation crystal of NaJ-(Tl) of 3 mm. thickness and 12 cm.$^2$ effective area. A Phillips photo multiplier of the type AVP 50 is used, also a Phillips single channel discriminator. This apparatus achieved a sensitivity of ±0.01% of cobalt in benzoyl. The sensitivity can be enlarged by using scintillation crystal which is twice as large as by using an activity of four times the value referred to above, or by combining a larger crystal with a more active beta radiation source.

It will be understood, that other substances can be employed for both, X-ray source and detectable element.

The invention is not limited to the embodiments described above but all changes and modifications thereof not constituting departures from the spirit and scope of the inventions are intended to be covered by the following claims.

I claim:

1. Apparatus for detecting specific substances in a fluid comprising: a container defining a measuring chamber for such fluid containing a first substance to be detected, a second substance in said container at one side of said chamber having X-ray emission lines in the immediate frequency range of the K and L absorption edges of said first substance, said second substance further having an atomic number higher by at least two units than that of said first substance to be detected in said fluid; a particle radioactive source disposed at said container outside of said chamber and adjacent said second substance; and an X-ray receiving means disposed at said container on the side of said chamber opposite to said second substance, and defining a measuring path from said first substance through said fluid in said chamber, said receiving means being responsive to X-rays of the quantum energies falling in the range of the K and L absorption edges of said first substance.

2. Apparatus according to claim 1, wherein said container is a measuring tube having input and outlet apertures respectively located at the opposite ends thereof across said measuring path.

3. Apparatus according to claim 1, wherein the said means is a radioactive element selected from the group consisting of tritium, $^{14}$C, $^{90}$Sr, $^{63}$Ni.

4. Apparatus according to claim 1, wherein said means includes $^{210}$Ra.

5. Apparatus for detecting specific substances in a fluid comprising: a container defining a measuring chamber for such fluid containing a first substance to be detected, a second substance in said container at one side of said chamber having X-ray emission lines in the immediate frequency range of the K and L absorption edges of said first substance, said second substance further having an atomic number which is at least twelve and higher by at least two units than that of said first substance to be detected in said fluid; a particle radioactive source disposed at said container outside of said chamber and adjacent said second substance; and an X-ray detector disposed at said container on the side of said chamber opposite to said first substance, said X-ray detector being of such dimensions that most of the quanta sensed have an energy about the K and L absorption edge of said first substance.

6. Apparatus for detecting specific substances in a fluid comprising: a container defining a measuring chamber for such fluid containing a first substance to be detected, a second substance in said container at one side of said chamber having X-ray emission lines in the immediate frequency range of the K and L absorption edges of said first substance, said second substance further having an atomic number which is at least twelve and higher by at least two units than that of said first substance to be detected in said fluid; a particle radioactive source disposed at said container outside of chamber and adjacent said second substance; an X-ray detector disposed in said container at that side of said chamber opposite to said first substance so that a measuring path for X-rays is defined from said first substance through the fluid in said chamber to said detector; a pulse discriminator connected electrically to said X-ray detector and being tuned to a narrow quantum energy range including the K and L absorption edges of said first substance; and a rate meter connected to said discriminator.

References Cited by the Examiner

UNITED STATES PATENTS

| 2,937,275 | 5/1960 | Thourson et al. | 250—43.5 |
| 2,977,474 | 3/1961 | Lewis | 250—43.5 |
| 2,998,524 | 8/1961 | Friedman | 250—86 |
| 2,999,935 | 9/1961 | Foster | 250—106 X |

RALPH G. NILSON, *Primary Examiner.*

A. R. BORCHELT, *Assistant Examiner.*